United States Patent
Gobin et al.

(10) Patent No.: US 12,234,384 B2
(45) Date of Patent: Feb. 25, 2025

(54) ADHESION-IMPROVING COMPOSITION FOR TEXTILE MATERIAL AND ASSOCIATED REINFORCING TEXTILE MATERIAL

(71) Applicant: PORCHER INDUSTRIES, Badinieres (FR)

(72) Inventors: Maëlle Gobin, Valence (FR); Léo Poupart, Les Echets (FR)

(73) Assignee: PORCHER INDUSTRIES, Badinieres (FR)

( * ) Notice: Subject to any disclaimer, the term of this patent is extended or adjusted under 35 U.S.C. 154(b) by 1051 days.

(21) Appl. No.: 17/050,785

(22) PCT Filed: Apr. 26, 2019

(86) PCT No.: PCT/EP2019/060810
§ 371 (c)(1),
(2) Date: Oct. 26, 2020

(87) PCT Pub. No.: WO2019/207141
PCT Pub. Date: Oct. 31, 2019

(65) Prior Publication Data
US 2021/0115310 A1   Apr. 22, 2021

(30) Foreign Application Priority Data

Apr. 26, 2018 (FR) ..................... 1853655

(51) Int. Cl.
| | | |
|---|---|---|
| C09J 109/08 | (2006.01) | |
| C09J 5/00 | (2006.01) | |
| C09J 11/08 | (2006.01) | |
| C09J 111/02 | (2006.01) | |

(52) U.S. Cl.
CPC .............. *C09J 109/08* (2013.01); *C09J 5/00* (2013.01); *C09J 11/08* (2013.01); *C09J 111/02* (2013.01); *C09J 2400/266* (2013.01); *C09J 2409/00* (2013.01); *C09J 2411/00* (2013.01); *C09J 2421/008* (2013.01); *C09J 2461/00* (2013.01); *C09J 2497/00* (2013.01)

(58) Field of Classification Search
CPC ... C09J 109/08; C09J 5/00; C09J 11/08; C09J 111/02; C09J 2400/266; C09J 2409/00; C09J 2411/00; C09J 2421/008; C09J 2461/00; C09J 2497/00

USPC ........................................................ 528/230
See application file for complete search history.

(56) References Cited

U.S. PATENT DOCUMENTS

| | | | |
|---|---|---|---|
| 3,884,862 A | 5/1975 | King | |
| 4,016,119 A | 4/1977 | Elmer | |
| 4,026,744 A | 5/1977 | Elmer | |
| 4,204,982 A * | 5/1980 | Neubert | ..................... C08J 5/06 156/307.3 |
| 4,524,093 A | 6/1985 | Devry | |
| 10,040,976 B2 | 8/2018 | Doisneau et al. | |
| 2004/0089418 A1 | 5/2004 | Li | |
| 2014/0235125 A1 | 8/2014 | Doisneau et al. | |
| 2015/0259534 A1* | 9/2015 | Dowden | ................. C08L 61/34 524/541 |
| 2016/0251550 A1 | 9/2016 | Michoud et al. | |
| 2019/0170290 A1 | 6/2019 | Carton et al. | |
| 2021/0115310 A1 | 4/2021 | Gobin et al. | |

FOREIGN PATENT DOCUMENTS

| | | |
|---|---|---|
| JP | A1976115556 | 10/1976 |
| JP | 2012121938 | 6/2012 |
| WO | WO 97/11109 | 3/1997 |
| WO | WO 2015/147165 | 10/2015 |
| WO | WO 2018/003572 | 1/2018 |

OTHER PUBLICATIONS

International Search Report dated Jun. 28, 2019 in International Application No. PCT/EP2019/060810.
Preliminary Report on Patentability dated Jan. 15, 2019 in French Application No. 1853655.

* cited by examiner

*Primary Examiner* — David T Karst
(74) *Attorney, Agent, or Firm* — B. Aaron Schulman, Esq.; Stites & Harbison, PLLC

(57) ABSTRACT

The invention relates to a textile bonding composition comprising a salt of lignosulfonate, an aldehyde hardener thereof, and an elastomer latex. The lignosulfonate salt may be sodium, potassium, magnesium, ammonium, or calcium lignosulfonate. The invention also relates to the use of such a composition for imparting adhesion properties to a reinforcement textile, with regard to a rubber, a reinforcement textile, in particular yarn, cord or textile structure, at least partially coated and/or impregnated with this composition, and a part made of rubber or comprising a rubber, in which the rubber comprises at least one reinforcement textile, on the surface and/or integrated inside the rubber.

20 Claims, No Drawings

ADHESION-IMPROVING COMPOSITION FOR TEXTILE MATERIAL AND ASSOCIATED REINFORCING TEXTILE MATERIAL

The present invention relates to an adhesive or bonding composition for textiles, in particular a composition for causing a textile to adhere to a rubber. The invention relates in particular to applications in the field of belts, pipes, tires, pneumatic springs (airspring) and, more generally, any part or article made of rubber, or comprising a part made of rubber, in which the rubber comprises a reinforcement textile on the surface and/or in depth (in the mass). The invention thus also relates to reinforcement textiles coated with this adhesive, and the parts or articles incorporating them both on the surface and in depth.

BACKGROUND OF THE INVENTION

To take the example of transmission belts, the textile reinforcement must first and foremost ensure the dimensional stability of the belt. To this end, the reinforcement is required to have specific mechanical properties in various environments. To ensure the required properties, and in particular to avoid a risk of delamination, the textile reinforcement must adhere to the rubber of the belt. The reinforcement may be in contact with one rubber or several different rubbers. To allow good compatibility with rubber, the reinforcement is generally treated with an adhesive. More complex properties may also be required from the reinforcement. For example, the edge of the reinforcement, upon being cut and exposed at the side of the belt, must not fray, but while being easy to cut. To guarantee these other properties, other types of treatments may be applied to the yarn.

Since several different treatments are applied to the textile reinforcement, it is imperative to ensure the compatibility of the adhesive with the reinforcement, the rubber and also the other treatments applied to the reinforcement.

To obtain all of these properties, it is necessary to provide structure to the yarn, especially in the form of a cord, and to provide several chemical and heat treatments.

The primary purpose of chemical treatments is to cause a given reinforcement to adhere to the various rubbers that it may encounter. The treatments are as varied as there are types of reinforcements [glass, aramid, polyamide (PA), polyethylene terephthalate (PET), etc.] and rubber families.

The heart of the treatment for causing a reinforcement textile to adhere to the rubber is the so-called resorcinol-formaldehyde-latex or RFL treatment. It is a system involving mixing a latex (colloidal aqueous dispersion of elastomer or polymer) and thermosetting resins of the phenoplast or aminoplast type. This system is historical; it was widely developed in the 70s and remains the treatment of choice. Despite numerous attempts at replacement, it has never been possible to provide a comprehensive solution to achieve equivalent performance until now. It is totally optimized to obtain the maximum static adhesion, i.e. without dynamic stress.

The heat treatment has an impact on the chemical properties (adhesion) but also on the mechanical properties in the case of synthetic reinforcements. It impacts the withdrawal characteristics, among others. The treatment in the ovens results from the consensus between the maintenance of the mechanical properties and the crosslinking of the adhesive.

For all these reasons, the new treatment must therefore be able to adapt to current treatment conditions, in order to ensure the mechanical properties. However, an adhesive allowing treatment at a lower temperature will potentially provide new and interesting properties in certain applications, and will exhibit a favorable energy aspect.

However, to improve adhesion performance, or to provide abrasion resistance, up to four different treatments may need to be applied to a textile successively, including the treatment with RFL. These are the following treatments:
1) The core treatment of the yarn which allows the filaments to be trapped in a matrix and to block the filaments between them. It thus gives resistance to fraying and makes the yarn stiff.
2) Pre-activation, to improve adhesion.
3) RFL treatment, in one or two layers.
4) Overcoats in the form of commercial adhesion promoters, or solutions of elastomers (sometimes called cementation).

It is therefore also preferable that any change in a formulation does not call into question the functionality of the various chemical and thermal (or physical, more generally) treatments usually used for various applications.

Considering all the constraints mentioned above, the RFL treatment has established itself as the treatment of choice enabling adhesion between the textile and the rubber. The phenomena involved in adhesion are brought into play during the vulcanization of the rubber part, while the RFL treatment itself may be applied to the textile several months before. This is why the term "bonding" treatment is often used, the term "adhesion" being rather reserved for the state of adhesion. In RFL, latexes are aqueous colloidal dispersions of elastomers or polymers, generally similar in nature to the rubber to be bonded. However, these latexes do not have real mechanical properties on their own. To ensure the strength of the system, a thermoset resin (thermosetting) is added. This is RF resin, made from resorcinol and formaldehyde. Via its polarity, it allows good adhesion to the textile. It forms a mesh in which the latex is trapped, which stiffens the system. This mesh remains sufficiently flexible to allow the diffusion of the elastomer chains in the matrix and then create good adhesion to the rubber (entanglement, molecular interactions and possibly co-crosslinking during vulcanization).

RFL contains formalin and resorcinol which are now suspected carcinogens. It would therefore be interesting to find an alternative to this formalin and to resorcinol or to the RFL composition as a whole. The complex properties of RFL, both in terms of its implementation and in the properties of use of the end products incorporating it, which were recalled above, make the exercise of finding an alternative solution a real challenge. It would be even more interesting to find such a solution which is more than an alternative, but which also offers an increase in performance. These are the challenges that the inventors set out to overcome.

The object of the invention is thus to provide new adhesion solutions which make it possible in particular to replace RFLs in their known applications, and offer performance levels that are close to or even greater, and this with components that are acceptable in the context of sustainable development and under favorable economic conditions.

Lignosulfonates are offered as a natural adhesive and as a short fiber binder for making mats (nonwovens) in combination with lignosulfonate hardeners, or as adhesives in multi-layer wood-based products. They have never been proposed in alternative compositions to RFLs and there is no indication that lignosulfonates could prove to be suitable for developing adhesion formulas to ensure a bond with rubbers and offering sufficient mechanical performance.

SUMMARY OF THE INVENTION

The object of the invention is therefore an adhesive or bonding composition for textiles comprising (or based on, consisting essentially of, or consisting of) a lignosulfonate salt, an aldehyde hardener of this salt, and a polymer latex, in particular of elastomer. The adhesive composition may be a suitable bonding composition allowing textiles to adhere to a rubber or the like.

The invention also relates to the use of a bonding composition according to the invention, to impart adhesion properties to a reinforcement textile, with regard to a rubber or the like.

The invention also relates to a reinforcement textile, in particular yarn, cord or textile structure, at least partially coated and/or impregnated with a bonding composition according to the invention.

The invention also relates to an article or part made of rubber (or similar material) or comprising a part made of rubber (or similar material), in which the rubber comprises at least one reinforcement textile according to the invention, on the surface and/or integrated inside the rubber or rubber matrix.

Other objects of the invention will become apparent upon reading the detailed description which follows.

DETAILED DESCRIPTION

The first object of the invention is therefore an adhesive or bonding composition for textiles, comprising (or based on, consisting essentially of, or consisting of) a lignosulfonate salt, an aldehyde hardener of this salt, and a latex of elastomer.

The lignosulfonate salt and the lignosulfonate salt hardener, by definition, react together to give a reaction product, in a method referred to herein as "curing". The invention therefore also relates to a composition which comprises the elastomer latex and a product or resin formed or comprising the reaction product between the lignosulfonate salt and its aldehyde hardener, typically once it has formed after the reaction or curing time. "Reaction product" is understood to mean the product of the reaction between lignosulfonate and aldehyde, which does not include any additives which could enter into the final composition.

This composition may in particular be obtained by a method, also an object of the invention, according to which the three ingredients are mixed with stirring, and, preferably, the composition is cured.

As illustrated in the examples, according to a first embodiment, the lignosulfonate salt may be dissolved in water before mixing the solution obtained with the latex and the aldehyde. This solubilization may be facilitated by working in a basic medium, by adding a soda and/or ammonia type agent. According to one method, the lignosulfonate salt solution and the latex are mixed first, and only then is the aldehyde added. In one embodiment of the preparation method, the lignosulfonate salt may be dissolved in water with stirring and in the presence of the agent allowing the pH to be basic, the mixture is stirred until solubilization, preferably total, the latex is then added, while stirring, before incorporating, still with stirring, the hardener (preferably the latter is dissolved or dispersed beforehand in water, e.g. with vigorous stirring). The method makes it possible to obtain a composition, which may be left to cure (in particular several hours, for example from about 2 to about 48 hours, for example between about 15 and about 25° C.) allowing the reaction product to set. The composition, especially after curing, may be used as a ready-to-use bonding composition or which may be diluted on demand.

According to another embodiment of the method, it is possible to mix an aqueous solution of lignosulfonate and of aldehyde hardener, before adding, with stirring, an aqueous dispersion of latex. Advantageously, the pH of the solution of lignosulfonate or of lignosulfonate and of hardener is adjusted to be basic, for example by adding sodium hydroxide and/or ammonia, before incorporation of the latex. The composition may then be left to cure under the same conditions as above. The composition, especially after curing, may be used as a ready-to-use bonding composition or which may be diluted on demand.

Without wishing to be bound by theory, upon curing or after curing of the composition, the bonding composition comprises a reaction product between hardener and lignosulfonate. This composition may in particular be characterized by the absence, or a reduced amount, of hardener in the free state. The curing conditions are suitable to obtain a usable bonding composition according to the invention. In particular, these conditions must not lead to the setting in mass or excessive hardening of the composition which would render the latter unsuitable for its application to the supports for which it is intended. Curing of in particular several hours has been defined here, for example from about 2 to about 48 hours, for example at a temperature of between about 15 and about 25° C. However, it may be possible to deviate from these conditions depending on the ingredients used as long as the bonding composition remains suitable for its use as described below, for example in terms of viscosity.

The latex is preferably a basic aqueous dispersion of the polymer(s) and/or elastomer(s). It is also possible to work according to the invention at neutral pH. The working pH values may in particular be those mentioned below with regard to the pH of the composition.

The term "elastomer" is understood to mean, in particular, a polymer or copolymer chain whose glass transition temperature ($T_v$) is less than approximately 25° C. Elastomers are present in the rubber to be bonded and in the latex of the bonding composition. An "elastomer latex" is a colloidal aqueous dispersion of an elastomer.

By "rubber" or "elastomeric material" is meant here the vulcanized or crosslinked product prepared from elastomer or elastomeric rubber, synthetic or natural, of one or more types of fille(s) reinforcing agent(s) (carbon blacks, silica, kaolins, etc.), plasticizer(s), vulcanizing agent(s) (sulfur, peroxide, metal oxides and the necessary accelerators), any other usual additives for the application in question (for example to facilitate the implementation, for protection against oxygen, ozone, heat, flame, UV). The invention also relates to both synthetic rubbers and natural rubber. Rubbers, formulated on the basis of elastomers, are materials whose obtained $T_v$ is then lower than the operating temperature of the part.

Lignosulphonates are by-products resulting from the transformation of wood, in particular from the treatment of wood for the manufacture of paper pulp according to the method known as the "acidic bisulphite cooking method". This method, which uses a bisulfite, allows, depending on the nature of the counterion used, us to obtain the corresponding lignosulfonate salts. These lignosulfonates may also come from a method intended to produce them from wood.

Preferably, in the bonding composition, the lignosulfonate salt may be a sodium, potassium, magnesium, ammonium or calcium salt.

In an exemplary embodiment, lignosulphonates prepared by the bisulphite method from maritime pine, for example from Landes (France), are used.

Preferably, the bonding compositions do not include formaldehyde or formalin. Preferably, the bonding compositions do not include resorcinol. Preferably, the bonding compositions do not include formaldehyde or formalin, or resorcinol.

Preferably, the aldehyde hardener has at least 2 carbon atoms and carries at least one aldehyde group (—CHO). By convention, the carbon atom of CHO is included in the carbon number of the hardener compound.

The aldehydes may in particular be water soluble or, if they are not, they may be dispersible in water, for example with adequate stirring.

The hardener may be a monoaldehyde (only 1 —CHO group), a dialdehyde (2 —CHO groups), a trialdehyde (3 —CHO groups), or a polyaldehyde in the form of a polymer bearing non-enolized aldehyde units.

1) Monoaldehyde: compound containing an aldehyde group placed at the end of a hydrocarbon chain, such that the maximum length of the main carbon chain is less than or equal to 20 carbon atoms. The chain structure may be either linear, branched or cyclic.

1a) Case of linear chains:
  Totally saturated (alkane) such that the chain length is between C2 and C20, preferably C2 to C14
    Even more preferably among the compounds: acetaldehyde, priopionaldehyde, butyraldehyde, pentanal (valeraldehyde), hexanal, heptanal, octanal, nonanal, decanal, undecanal, dodecanal, tridecanal, tetradecanal (myristaldehyde)
  Or having one or more unsaturations such that the carbon chain is not completely conjugated (alkene chain) and that the chain length is between C4 and C20, preferably between C4 and C8:
    More specifically, chains with a single unsaturation
      Even more specifically among the following cis and trans isomeric compounds: 2-butenal (crotonaldehyde), 3-butenal, 2-hexenal, 3-hexenal, 2-heptenal, 3-heptenal, 5-heptenal, 2-octenal
    More specifically, chains with several unsaturations.
      Even more specifically among the following cis and trans isomeric compounds: 2,4-pentadienal; 2,4-hexadienal, 2,4-heptadienal; 3,5-heptadienal; 2,4-octadienal (each of these compounds in cis or trans).

1b) Case of branched chains (chains with substituents)
  Fully saturated hydrocarbon chain presenting one or more ramifications only of a hydrocarbon nature
    More specifically, the maximum length of the main chain is C8, in particular from C3 to C8,
    More specifically, the substituent group(s) may be methyl, ethyl, propyl, butyl, pentyl, hexyl radicals
      Even more specifically chosen from the following compounds: isobutyraldehyde; isovaleraldehyde; 2-methylbutyraldehyde; 3,5,5-trimethylhexanal, trimethylacetaldehyde
    More specifically, the substituent groups of the linear chain may be saturated, unsaturated or aromatic hydrocarbon rings, which may themselves be substituted, more precisely: cyclopentyl, cyclohexyl, cyclooctyl, cyclohexenyl, phenyl,
      Even more specifically chosen from the following compounds: phenylacetaldehyde; 3-phenylpropionaldehyde (hydrocinnamaldehyde); 2-phenylpropionaldehyde (hydratropaldehyde), 2-Methyl-3-(p-isopropylphenyl) propionaldehyde (cyclamenaldehyde), hydrocinnamaldehyde
  Or hydrocarbon chain having one or more unsaturations and having one or more ramifications only of a hydrocarbon nature
    More specifically, the maximum length of the main chain is C8, in particular from C3 to C8,
    More specifically, the substituent group(s) may be methyl, ethyl, propyl, butyl, pentyl, hexyl radicals
      Even more specifically chosen from the following compounds: 2-Methylbut-2-enal (tiglic aldehyde); 2,6-dimethyl-5-heptenal (melonal); 2-methyl-2-pentenal; α-hexylcinnamaldehyde; α-amylcinnamaldehyde
    More specifically, the substituent groups of the linear chain may be saturated, unsaturated or aromatic hydrocarbon rings, more specifically: cyclopentyl, cyclohexyl, cyclooctyl, cyclohexenyl, phenyl.
      Even more specifically chosen from the following compounds: cinnamaldehyde, α-hexylcinnamaldehyde, α-amylcinnamaldehyde, phenylcinnamaldehyde,
    More specifically, the substituent groups of the linear chain may be aromatic rings themselves comprising one or more substituents on the aromatic ring.
      Even more specifically chosen from the following compounds: methylcinnamaldehyde and positional isomers,
  Or completely saturated hydrocarbon chain having one or more branches comprising a heteroatom.
    More specifically the maximum length of the main chain is C8, in particular C3 to C8
    More specifically, the substituent groups are of the following nature:
      Hydroxyl
        Even more specifically chosen from the following compounds: 7-Hydroxy-3,7-dimethyl-octanal (Hydroxycitronellal), D-erythrose
      Ether
        Even more specifically chosen from the following compounds: Benzyloxyacetaldehyde
      Halogen
  Or a hydrocarbon chain having one or more unsaturations and having one or more ramifications comprising a meteoratom.
    More specifically, the maximum length of the main chain is C8, in particular C3 to C8,
    More specifically, the substituent groups are of the following nature:
      Hydroxyls
      Ether
      Ester
      Halogen
        Even more specifically chosen from the following compounds: α-Bromocinnamaldehyde; α-Chlorocinnamaldehyde
      Hydrocarbon chains substituted by hydroxy, ether, halogen, ester groups Even more specifically chosen from the following compounds: 2-Hydroxycinnamaldehyde, 4-Hydroxycinnamaldehyde, 2-Methoxycinnamaldehyde, 3,5-Dimethoxy-4-hydroxycinnamaldehyde (Sinapinaldehyde), 4-Acetoxy-3-methoxycinnamaldehyde, 4-Hydroxy-3-methoxy (coniferaldehyde), 4-Chlorocinnamaldehyde, 4-Bromocinnamaldehyde, 4-Fluorocinnamaldehyde, 2,6-Difluorocinnamaldehyde 1c) Case of cyclic aldehydes: compounds of the carbaldehyde family, i.e. compounds for which the aldehyde group is directly attached to a ring. The cycle is defined as being a monocycle comprising at most 8 carbon atoms, in particular from 3 to 8 carbon atoms. More specifically, the cycle may be of a nature:

Totally carbonated and non-aromatic
    Without unsaturation: the cycle may be in particular cyclopropane, cyclopentane, cyclohexane, cycloheptane, cyclooctane, and
    Without hydrocarbon or heteroaromatic substituents on the ring
        Even more specifically chosen from the following compounds: cyclopentanal, cyclopropanal, cyclohexanal, cycloheptanal, cyclooctanal
    Or, with hydrocarbon and/or heteroatomic substituents on the ring
    Or presenting one or more unsaturations
        Without hydrocarbon or heteroaromatic substituents on the ring
        With hydrocarbon and/or heteroatomic substituent on the cycle Or heteroatomic and non-aromatic
    Without unsaturations
        Without hydrocarbon or heteroaromatic substituents on the ring
        With hydrocarbon and/or heteroatomic substituent on the cycle
    Or presenting one or more unsaturations
        Without hydrocarbon or heteroaromatic substituents on the ring
        With hydrocarbon and/or heteroatomic substituent on the cycle Or totally carbonated and aromatic
    Without substituents
        Even more specifically chosen from the following compounds: benzaldehyde
    Or with 1 or more hydrocarbon and/or heteroatomic substituents.
        The substituents may be of halogen nature, more particularly chlorine, bromine, iodine
        Even more specifically chosen from the following compounds: Chloro: 4-chlorobenzaldehyde; 3-Chlorobenzalhyde; 2-Chlorobenzaldehyde; 2,4-dichlorobenzaldehyde; 2,5-dichlorobenzaldehyde; 2,6-dichlorobenzaldehyde; 3,5-dichlorobenzaldehyde; 2,3,6-trichlorobenzaldehyde; 2-bromobenzaldehyde; 3-bromobenzaldehyde; 4-bromobenzaldehyde; 3,4-dibromobenzaldehyde; 3,5-dibromobenzaldehyde; 2,5-dibromobenzaldehyde; 2-iodobenzaldehyde, 3-iodobenzaldehyde; 4-iodobenzaldehyde
        Or the substituents may be of alkyl nature (C1 to C8), more particularly methyl, ethyl, propyl, butyl, phenyl,
        Even more specifically chosen from the following compounds: 2-methylbenzaldehyde, 3-methylbenzaldehyde, 4-methylbenzaldehyde (o-m-p-isomers of tolualdehyde); 2,4-Dimethylbenzaldehyde, 2,5-dimethylbenzaldehyde, 2,6-dimethylbenzaldehyde; 2,4,6-trimethylbenzaldehyde (mesitaldehyde); 4-ethylbenzaldehyde, 2-ethylbenzaldehyde; Biphenyl-2-carboxaldehyde, Biphenyl-3-carboxaldehyde, Biphenyl-4-carboxaldehyde; 2,5-di-tertbutylbenzaldehyde; 4-tertbutylbenzaldehyde; 4-isopropylbenzaldehyde (cuminaldehyde)
        Or the substituents may be of ether nature, more particularly methoxy, ethoxy, phenoxy and benzyloxy
        Even more specifically chosen from the following compounds: Isomers of anisaldehyde: 2-methoxybenzaldehyde; 3-methoxybenzaldehyde and 4-methoxybenzaldehyde; isomers of veratraldehyde: 2,3-dimethoxybenzaldehyde; 2,4-dimethoxybenzaldehyde; 2,5-dimethoxybenzaldehyde; 2,6-dimethoxybenzaldehyde; 3,4-dimethoxybenzaldehyde; 3,5-dimethoxybenzaldehyde; 2-ethoxybenzaldehyde; 3-ethoxybenzaldehyde; 4-ethoxybenzaldehyde; 3,4-ethoxybenzaldehyde; 3-phenoxybenzaldehyde; 4-phenoxybenzaldehyde; 2-benzyloxybenzaldehyde, 3-benzyloxybenzaldehyde; 4-benzyloxybenzaldehyde.
        Or the substituents may be hydroxyl in nature. Even more specifically chosen from the following compounds: 2-hydroxybenzaldehyde (salicylaldehyde); 3-hydroxybenzaldehyde; 4-hydroxybenzaldehyde; 2,3-dihydroxybenzaldehyde; 2,4-dihydroxybenzaldehyde; 2,5-dihydroxybenzaldehyde (gentisalehyde); 3,4-dihydroxybenzaldehyde; 3,4,5-trihydroxybenzaldehyde; 2,4,5-trihydroxybenzaldehyde; 2,3,4-trihydroxybenzaldehyde; 2,4,6-trihydroxybenzaldehyde (phloroglucinaldehyde).
        When the aromatic ring has several substituents, these may be of a different nature, chosen from the families described above.
        Even more specifically chosen from the following compounds: 2-hydroxy-3-methoxybenzaldehyde; 2-hydroxy-4-methoxybenzaldehyde; 3-hydroxy-4-methoxybenzaldehyde (isovanillin); 4-hydroxy-2-methoxybenzaldehyde; 4-Hydroxy-3-methoxybenzaldehyde (vanillin); 2,6-dimethoxy-4-hydroxybenzaldehyde; 3,4-dimethoxy-5-hydroxybzenzaldehyde; 3,5-dimethoxy-4-hydroxybenzaldehyde (syringaldehyde); 4-ethoxy-3-methoxybenzaldehyde; 3-ethoxy-4-methoxybenzaldehyde; 2-ethoxy-3-methoxybenzaldehyde; 2-benzoyloxy-3-methoxybenzaldehyde; 3-benzoyloxy-4-methoxybenzaldehyde; 4-benzoyloxy-3-methoxybenzaldehyde; Myristicin aldehyde.

Or aromatic heterocycles
    Without substituents
        Even more specifically chosen from the following compounds: 2-pyridinecarboxaldehyde; 3-pyridinecarboxaldehyde; 4-pyridinecarboxaldehyde; 2-Thiazolecarboxaldehyde; pyrrol-2- carboxaldehyde; 3-thiophenecarboxaldehyde; indol-3-carboxaldehyde.

Or with hydrocarbon and/or heteroatomic substituents

Even more specifically chosen from the following compounds: 3-methyl-2-thiophene carboxaldehyde (or 3-methylthiophene-2-carboxaldehyde); 6-methylpyridinecarboxaldehyde; N-benzylpyridine-4-carboxaldehyde; 1-methylimidazolecarboxaldehyde.

2) Dialdehyde: compound containing 2 aldehyde groups such as:

The aldehyde groups are placed at the end of a hydrocarbon chain, such that the maximum length of the main carbon chain is less than or equal to 20 carbon atoms. The chain may be substituted by linear, branched or cyclic C1-C8 alkyl, halogen, hydroxyl, ether or ester groups.

More specifically: glutaraldehyde, bromomalonaldehyde

The carbon chain carrying the aldehyde group may be a cycle.

More specifically: terephthaldehyde; o-Phthalaldehyde, m-Phthalaldehyde

Carbon chains may be linked together by heteroatoms (ether bonds), without the total number of carbon atoms in the structure formed being greater than 20 atoms.

More specifically: 4-(4-formylphenoxy) benzaldehyde; 4-(2-formylphenoxy)benzaldehyde;

3) Trialdehyde: compound containing 3 aldehyde groups chosen from the compounds:

Tris (4-formylphenyl) amine;

4) Polyaldehyde: compounds formed from a polymer chain containing non-enolized aldehyde units such as The aldehyde unit is present on the monomer (homopolymer) and is not involved in the polymerization reaction The aldehyde unit is present on at least one of the monomers (co-polymer) and is not involved in the polymerization reaction The aldehyde unit is obtained by post-polymerization reaction such as Lyse Oxidation Grafting In one embodiment, the aldehydes not having a hydrogen atom in the alpha of CO are preferably chosen in that they are non-enolizable. It should be noted that these non-enolizable aldehydes may then carry out, under basic conditions, a Canizarro reaction and possibly lead to the presence of a reaction intermediate of the carboxylic acid type.

As preferred examples of these non-enolizable aromatic aldehydes, there may be mentioned:

for the unsubstituted: benzaldehyde, for mono-substituted: hydroxybenzaldehyde (and positional isomers: 3-hydroxybenzaldehyde, 4-hydroxybenzaldehyde, salycylaldehyde); p-anisaldehyde (and o-isomer); p-tolualdehyde (and ortho isomer);

for the poly-substituted: veratraldehyde, syringaldehyde, cuminaldehyde, vanillin, ethylvaniline, 2,4-dihydroxybenzaldehyde, 3,4-dihydroxybenzaldehyde; 3-hydroxy-4-methoxybenzaldehyde.

Mention may also be made of cinnamaldehyde.

The use of a non-enolizable aldehyde is a particular embodiment.

The aldehyde hardener may in particular be an aldehyde chosen from the group consisting of acetaldehyde; priopionaldehyde; butyraldehyde; pentanal (valeraldehyde); hexanal; heptanal; octanal; nonanal; decanal; undecanal; dodecanal; tridecanal; tetradecanal (myristaldehyde); 2-butenal (crotonaldehyde); 3-butenal; 2-hexenal; 3-hexenal; 2-heptenal; 3-heptenal; 5-heptenal; 2-octenal; 2,4-pentadienal; 2,4-hexadienal; 2,4-heptadienal; 3,5-heptadienal; 2,4-octadienal; isobutyraldehyde; isovaleraldehyde; 2-methylbutyraldehyde; 3,5,5-trimethylhexanal; trimethylacetaldehyde; phenylacetaldehyde; 3-phenylpropionaldehyde (hydrocinnamaldehyde); 2-phenylpropionaldehyde (hydratropaldehyde); 2-Methyl-3-(p-isopropylphenyl) propionaldehyde (cyclamen aldehyde); hydrocinnamaldehyde; 2-Methylbut-2-enal (tiglic aldehyde); 2,6-dimethyl-5-heptenal (melonal); 2-methyl-2-pentenal; α-hexylcinnamaldehyde; α-amylcinnamaldehyde; cinnamaldehyde; α-hexylcinnamaldehyde; α-amylcinnamaldehyde; phenylcinnamaldehyde; methylcinnamaldehyde and positional isomers; 7-Hydroxy-3,7-dimethyl-octanal (Hydroxycitronellal); D-erythrosis; benzyloxyacetaldehyde; 2-Hydroxycinnamaldehyde; 4-Hydroxycinnamaldehyde; 2-Methoxycinnamaldehyde; 3,5-Dimethoxy-4-hydroxycinnamaldehyde (Sinapinaldehyde); 4-Acetoxy-3-methoxycinnamaldehyde; 4-Hydroxy-3-methoxycinnamaldehyde (coniferaldhyde); 4-Chlorocinnamaldehyde; 4-Bromocinnamaldehyde; 4-Fluorocinnamaldehyde; 2,6-Difluorocinnamaldehyde; cyclopentanal; cyclopropanal; cyclohexanal; cycloheptenal; cyclooctanal; benzaldehyde; Chloro: 4-chlorobenzaldehyde; 3-Chlorobenzalhyde; 2-Chlorobenzaldehyde; 2,4-dichlorobenzaldehyde; 2,5-dichlorobenzaldehyde; 2,6-dichlorobenzaldehyde; 3,5-dichlorobenzaldehyde; 2,3,6-trichlorobenzaldehyde; 2-bromobenzaldehyde; 3-bromobenzaldehyde; 4-bromobenzaldehyde; 3,4-dibromobenzaldehyde; 3,5-dibromobenzaldehyde; 2,5-dibromobenzaldehyde; 2-iodobenzaldehyde; 3-iodobenzaldehyde; 4-iodobenzaldehyde; 2-methylbenzaldehyde; 3-methylbenzaldehyde; 4-methylbenzaldehyde (o-m-p-isomers of tolualdehyde); 2,4-Dimethylbenzaldehyde; 2,5-dimethylbenzaldehyde; 2,6-dimethylbenzaldehyde; 2,4,6-trimethylbenzaldehyde (mesitaldehyde); 4-ethylbenzaldehyde; 2-ethylbenzaldehyde; Biphenyl-2carboxaldehyde; Biphenyl-3-carboxaldeyde; Biphenyl-4-carboxaldeyde; 2,5-di-tertbutyl-benzaldehyde; 4-tertbutylbenzaldehyde; 4-isopropylbenzaldehyde (cuminaldehyde); Isomers of anisaldehyde: 2-methoxybenzaldehyde; 3-methoxybenzaldehyde and 4-methoxybenzaldehyde; isomers of veratraldehyde: 2,3-dimethoxybenzaldehyde; 2,4-dimethoxybenzaldehyde; 2,5-dimethoxybenzaldehyde; 2,6-dimethoxybenzaldehyde; 3,4-dimethoxybenzaldehyde; 3,5-dimethoxybenzaldehyde; 2-ethoxybenzaldehyde; 3-ethoxybenzaldehyde; 4-ethoxybenzaldehyde; 3,4-ethoxybenzaldehyde; 3-phenoxybenzaldehyde; 4-phenoxybenzaldehyde; 2-benzyloxybenzaldehyde; 3-benzyloxybenzaldehyde; 4-benzyloxybenzaldehyde; 2-hydroxybenzaldehyde (salicylaldehyde); 3-hydroxybenzaldehyde; 4-hydroxybenzaldehyde; 2,3-dihydroxybenzaldehyde; 2,4-dihydroxybenzaldehyde; 2,5-dihydroxybenzaldehyde (gentisalehyde); 3,4-dihydroxybenzaldehyde; 3,4,5-trihydroxybenzaldehyde; 2,4,5-trihydroxybenzaldehyde; 2,3,4-trihydroxybenzaldehyde; 2,4,6-trihydroxybenzaldehyde (phloroglucinaldehyde); 2-hydroxy-3-methoxybenzaldehyde; 2-hydroxy-4-methoxybenzaldehyde; 3-hydroxy-4-methoxybenzaldehyde (isovanillin); 4-hydroxy-2-methoxybenzaldehyde; 4-Hydroxy-3-methoxybenzaldehyde (vanillin); 2,6-dimethoxy-4-hydroxybenzaldehyde; 3,4-dimethoxy-5-hydroxybzenzaldehyde; 3,5-dimethoxy-4-hydroxybenzaldehyde (syringaldehyde); 4-ethoxy-3-methoxybenzaldehyde; 3-ethoxy-4-methoxybenzaldehyde; 2-ethoxy-3-methoxybenzaldehyde; 2-benzoyloxy-3-methoxybenzaldehyde; 3-benzoyloxy-4-methoxybenzaldehyde; 4-benzoyloxy-3- methoxybenzaldehyde; Myristicin aldehyde; 2-pyridinecarboxaldehyde; 3-pyridinecarboxaldehyde; 4-pyridinecarboxaldehyde; 2-Thiazolecarboxaldehyde; pyrrol-2-carboxaldehyde; 3-thiophenecarboxaldehyde; indol-3-carboxaldehyde; 3-methyl-2-thiophene carboxaldehyde; 6-methylpyridinecarboxaldehyde; N-benzylpyridine-4-carboxaldehyde; 1-methylimidazolecarboxaldheyde; glutaralhyde; bromomalonaldehyde; terephthaldehyde; o-Phthalaldehyde; m-Phthalaldehyde; 4-(4-formylphenoxy) benzaldehyde; 4-(2-formylphenoxy) benzaldehyde; Tris (4-formylphenyl) amine, and a mixture of at least two of them.

The hardener may in particular be chosen from: benzaldehyde, 4-hydroxybenzaldehyde, 3-hydroxybenzaldehyde, 2-methylbutyraldehyde, salicylaldehyde, 7-hydroxy-3,7-dimethyl-octanal, cyclohexanecarboxaldehyde, 3-chlorobenzaldehyde, 4-ethylbenzaldehyde, 4-ethylbenzaldehyde, 4-ethylbenzaldehyde hexenal, and mixtures thereof.

The latex may advantageously be a latex of acrylonitrile/carboxylated butadiene copolymer (XNBR), a latex of acrylonitrile/hydrogenated butadiene (HNBR), a latex of chlorosulfonated polyethylene (CSM), a latex of styrene-butadiene-vinylpyridine copolymer (VPSBR), a styrene/butadiene copolymer latex (SBR), an acrylonitrile/butadiene copolymer latex (NBR), a polybutadiene latex (BR), a chlorobutadiene latex (CR), a natural rubber latex (NR), a latex polyurethane, or a mixture of at least two of them.

The dry matter content of the composition by weight may be in particular between approximately 2 and approximately 38%, in particular between approximately 4 and approximately 30%, more particularly between approximately 7 and approximately 25%.

The composition according to the invention may in particular comprise from about 40 to about 95%, preferably from about 55 to about 90% or from about 40 to about 60, 70, 80 or 90% by weight of elastomer relative to to the composition.

Unless otherwise indicated, the composition is given as a dry matter.

In the composition, the hardener/lignosulfonate salt mass ratio may be in particular between approximately 0.1 and approximately 3, more particularly between approximately 0.15 and approximately 2.5, typically between approximately 0.4 and approximately 1.6. Lower or higher values may prove to be possible depending on the hardener and lignosulfonate salt pairs chosen and this parameter may be determined by those skilled in the art on the basis of this description.

In the composition, the [hardener+lignosulfonate salt]/latex mass ratio may be in particular between approximately 0.05 and approximately 0.6, more particularly between approximately 0.15 and approximately 0.5. Lower or higher values may prove to be possible depending on the compounds chosen in combination and this parameter may be determined by a person skilled in the art on the basis of this description.

According to an advantageous characteristic, the composition has a neutral or basic pH, in particular a pH of between approximately 7 and approximately 13, in particular between approximately 9 and approximately 13. The composition may comprise for this purpose an additive making it possible to adjust the pH, eg soda.

The composition comprises the water of the elastomer latex. Water may still be added, in order to make the applicable composition sufficiently fluid for a conventional application, for example by impregnation.

The composition may also comprise additives at a content in particular between 0 or 0.1 and approximately 50% by dry mass. The composition may in particular comprise an adhesion promoter (for example epoxy, silane, blocked isocyanate), a surfactant, a dispersant, an anti-foam agent, a wax (for example microcrystalline hydrocarbon wax in emulsion), a filler (for example carbon black, silica), a colorant, a metal oxide (for example ZnO), an elastomer crosslinking agent, an anti-UV agent, an anti-ozone agent, a heat-protective agent. These agents are additives conventionally used in RFL formulations. They are compatible with the adhesive object of the invention.

The viscosity of the bonding composition, measured at 23° C. using a Brookfield viscometer as detailed in the Examples section, may in particular be between approximately 1 and approximately 5, for example between approximately 1.5 and approximately 4.5, Cp or mPa·s. This viscosity may easily be adjusted by adjusting the water content, in particular.

The composition according to the invention may be applied to any textile. The term "textile" within the meaning of the invention is understood to mean: continuous monofilament yarn, continuous multifilament yarn, staple fiber, any assembly of monofilament and/or multifilament continuous yarns or chopped yarn, in particular a wick, a cord formed from such yarns by conventional twisting techniques and a "textile structure" formed from the assembly of yarns, twisted or cabled, in particular in the form of fabric, grid, etc. The term textile according to the invention does not cover nonwovens or mats of short fibers. The textiles of the invention, having been treated with the composition according to the invention, are designated by the expression "reinforcement textiles".

The textile may be organic or inorganic in nature. As the type of textile, mention may in particular be made of glass (in particular E glass or high modulus glass), basalt, carbon, aramid (meta or para), polyvinyl alcohols, cellulose, high density polyethylenes (HDPE), polyester (in particular polyethylene terephthalates, PET), polyamides (PA, in particular PA 4.6, PA 6.6, PA 6), acrylics, hybrids (aramid yarn+nylon yarn, cabled together; acrylic+glass+copper, cabled together), etc. When the textile is a cord or a textile structure of several yarns, the yarns may all be organic or inorganic in nature, or the cord or the textile structure may comprise both types of yarns, organic and inorganic.

An object of the invention is also a method for applying, or using, a bonding composition according to the invention, to impart bonding properties to such a textile, in particular with respect to an elastomeric material. This use may be broken down in terms of the method of bonding a textile according to the invention. This use or method comprises applying said composition to the textile (yarn, cord, textile structure), then drying it. This application may be carried out by the methods in use in industry, for coating, in particular by impregnation, as described below. The choice of latex, and therefore of the constituent elastomer, advantageously leans towards a formula similar to the nature of the constituent elastomer of the rubber to be treated, as is customary.

Other characteristics of the use or of the method will become apparent upon reading the remainder of the description, in particular in the general section on impregnation methods.

The object of the invention is also a reinforcement textile coated and/or impregnated with a bonding composition according to the invention. It also relates to the method of treating the textile to produce the reinforcement textile, by applying the bonding composition to said textile.

The object of the invention is in particular a yarn coated and/or impregnated with a bonding composition according to the invention. The yarn may be twisted before or after application of the composition, and solidification of the latter. When the yarn is multifilament, it may be fully impregnated, if necessary by splitting the yarn (spacing of the filaments by means known to those skilled in the art) before coating it with the composition. This yarn may in particular comprise, or be coated with, the hardened bonding composition (dried and/or crosslinked).

The object of the invention is also a cord coated and/or impregnated with a bonding composition according to the invention. This cord may in particular comprise, or be coated with, the hardened bonding composition (dried and/or crosslinked).

The cord may be formed from at least two yarns not coated with the bonding composition, generally each yarn is twisted, then the yarns are cabled (assembled together and twisted in the opposite direction to the twist of the elementary yarns), then the cord is coated of the bonding composition, which is hardened after application.

The cord may also be formed from the assembly of at least two yarns coated with the bonding composition, generally each yarn is twisted after solidification of the composition, and then the yarns are cabled (assembled together and twisted in the opposite direction of twist. elementary yarns); one may then provide a coating of the cord with other treatments ("overcoat" or "topcoat"), and then drying it.

The object of the invention is also a textile structure formed by assembling yarns by known techniques such as weaving or by gluing or welding in the case of grids. These textile structures are coated or impregnated with the composition of the invention, and the invention covers such textile structures coated with the hardened bonding composition.

The bonding compositions may be applied to textiles within the meaning of the invention by the methods used for RFLs. Firstly, the impregnation is retained, by direct soaking ("dipping") or by means of a lick roller.

The object of the invention is also an article or part made of rubber (or one comprising a rubber part), comprising at least one reinforcement textile, in particular yarn, cord and/or textile structure, according to the invention. This reinforcement textile may in particular be applied to the surface of the article or part and/or integrated inside the article or part.

As has been said, rubber is a vulcanizable formulation based on natural or synthetic elastomers, such as vulcanized (crosslinked) natural rubber (NR or polyisoprene), or a synthetic, vulcanized (crosslinked) rubber. As examples of synthetic rubber, mention may be made of rubbers of: polybutadiene (BR), polyurethane (AU or EU), polychloroprene (CR), silicone (VMQ, PVMQ) and fluorosilicone (FVMQ), ethylene-propylene-diene monomer (EPDM), butadiene-acrylonitrile copolymers (NBR for nitrile butadiene rubber), hydrogenated butadiene-acrylonitrile copolymers (HNBR), styrene/butadiene copolymer (SBR), epichlorohydrin (ECO or CO), butyl (IIR), bromobutyl (BIIR), chlorobutyl (CIIR), chlorinated polyethylenes (CM), chlorosulfonated polyethylenes (CSM), carboxylated nitrile butadiene acrylonitrile (XNBR), copolymers of ethylene and methyl acrylate (AEM), copolymers of ethylene and vinyl acetate (EVM and EVA), polyacrylates (ACM), fluorinated rubbers (FKM), perfluorinated rubbers (FFKM).

A rubber may also be a vulcanizable formulation based on mixtures or cuts of such elastomeric gums.

The rubber may also be a formulation based on thermoplastic elastomers (so-called "physically crosslinking" elastomers such as SBS, styrene-butadiene-styrene block).

The object of the invention is in particular an article or part made of elastomer or rubber comprising, embedded in its mass in elastomer or rubber, a reinforcement textile bonded according to the invention, for example one or more yarns, individual or cabled or else assembled in textile structures, or several of these categories.

The term "bonded" is understood to mean in particular that the reinforcement textile comprises or is coated with the hardened (dried and/or crosslinked) bonding composition.

The object of the invention is also an article or part made of elastomer or rubber comprising, bonded to at least one surface of this elastomer or rubber material, a bonded textile structure according to the invention.

The object of the invention is also an article or part made of elastomer or rubber comprising, embedded in its mass in elastomer or rubber, one or more yarns, individual or cabled or else assembled in textile structures, or several of these categories, and comprising in addition, bonded to at least one surface of this elastomeric or rubber material, a textile structure according to the invention, these reinforcement textiles being adhered according to the invention.

As articles, there may be mentioned, without being exhaustive, the following articles, which may incorporate at least one reinforcement textile bonded according to the invention, in particular yarn, cord or textile structure treated with the bonding composition of the invention, applied on the surface of the article to which it adheres and/or is integrated inside the elastomeric material of the article:

belts, in particular transmission belts, synchronous belts, conveyor belts, elevator belts, trapezoidal belts. The belts may comprise yarns or cords embedded in the mass of elastomer or rubber. They may also comprise, instead of or in addition to the yarn and cords, a textile structure, in particular a fabric, adhering to the surface, for example on the back in the transmission belt, and on the back and the notch for the belt. distribution flexible or rigid hoses, in particular brake hoses (comprising a braided textile structure, single or double braid), hoses, industrial hoses (comprising a wrapped or spiraled textile structure, i.e. manufactured by wrapping or by spiraling), including oil and gas hoses, hoses (knitted textile structure). Braiding, spiraling, knitting is generally carried out during the implementation of the pipe by extrusion.

specialty items: pneumatic springs ("air-springs"), kinetic coupling discs, pipe plugs, compensation joints.

tires: in particular heavy goods vehicles and racing.

As examples of rubber composition for these articles: transmission belt: based on EPDM or CR; synchronous belts: based on HNBR and CR; Hoses: based on SBR, or EPDM, or an NBR/PVC blend, or epichlorohydrin, or butyl; Airspring: based on CR; kinetic discs: based on CR or NR; tires: thick part comprising several mixtures, based on NR, BR or SBR The invention has the advantage of being integrated into the recovery of renewable non-food raw materials. It enables the recovery of lignin, currently a waste from the wood and paper industry. This compound is perfectly harmless, has a low cost, high performance. Its use does not compete with the food market, it is not subject to regulations on chemicals. This is an agro-resource.

EXAMPLES

I—Part Examples of Preparation of Adhesive Formula

The definitions and measurement or control methods described in this part are generally applicable on demand, unless otherwise specified.

The dry extract (or mass concentration) of the preparations is defined as the percentage of residual dry matter after evaporation of volatile materials (water, solvent) according to a defined drying method. The analysis is carried out using a desiccator balance, on a wet sample taken with mass $m_{ech}$=between 2 and 5 grams. The sample is placed in a pre-tared aluminum cup containing a binder-free glass fiber filter, with a surface density of 52 g·m$^2$ and a threshold of 1.6 μm. The whole is then subjected to a temperature of 120° C. until complete stabilization of the mass. The result is expressed in %.

The viscosity of the preparation is measured at 23° C. using a Brookfield viscometer. Unless otherwise specified, the measurement is carried out using a ULA (Ultra Low Viscosity Adaptator) module and a No. 1 mobile (low viscosity system) at a speed of 60 rpm (revolutions per minute).

The pH of aqueous preparations is measured using a METLER 340 pH meter, calibrated for measurements in a basic medium using buffer solutions. A glass electrode and 3M KCl electrolyte are used.

Unless otherwise stated, the water used for making the preparations is water of reverse osmosis quality, with a residual conductivity of less than 70 μS/cm.

Example I-1: Preparation of an Adhesive Based on Benzaldehyde, 4-hydroxybenzaldehyde or 3-hydroxybenzaldehyde In a first embodiment of the invention, 82 g of sodium lignosulfonate (Arbo N18; Tembec) are dissolved with stirring in 1184 g of water. 2.5 g of a 10% by mass sodium hydroxide solution are then added to the solution, which is kept stirring for 10 minutes to allow total solubilization. This solution is added with stirring to 983 g of a styrene-butadiene-vinylpyridine copolymer latex (VPSBR). The whole is kept under agitation (150 rpm) during the hardener preparation phase.

19 g of benzaldehyde are stirred vigorously (300 rpm) and 229 grams of water are added slowly to form a milky emulsion. This emulsion is immediately added with stirring to the preparation of lignosulfonate and latex. Stirring is maintained for a few minutes until complete homogenization.

After 12 hours of curing, 2.5 kg of a preparation that may be used for textile treatment were obtained. The preparation has a pH of 9.6, a dry extract of 18.7% and a viscosity of 3.2 mPa·s.

The same method was applied to produce 2 other compositions containing benzaldehyde, 3 compositions containing 4-hydroxybenzaldehyde and 3 compositions containing 3-hydroxybenzaldehyde, varying the following parameters:

Mass ratio of hardener/lignosulfonate salt: from 24% to 54.8%

Mass ratio of [lignosulfonate salt+hardener]/latex: from 18.4% to 24%

% by mass of dry latex in the composition: from 80 to 84.5%.

In total, 9 compositions were produced.

Example I-2: Preparation of an Adhesive Based on Benzaldehyde or 4-hydroxybenzaldehyde In a second embodiment of the invention, 55 g of sodium lignosulfonate are introduced into a container and 844 g of water are added gradually. The solution is stirred at 200 rpm. 23 g of a 10% by mass sodium hydroxide solution and 115 g of 20% by mass ammonia are then successively added with stirring to the preparation. The mixture is stirred at 200 rpm for 10 minutes.

The basic solution of sodium lignosulfonate is added with stirring to a latex preparation of a styrene-butadiene copolymer (SBR wet latex; 942 g) and of water (179 g) previously homogenized.

56 g of 4-Hydroxybenzaldehyde are stirred vigorously (300 rpm) and 285 grams of water are added slowly to form a milky emulsion. This emulsion is immediately added with stirring to the preparation of lignosulfonate and latex. Stirring is maintained for a few minutes until complete homogenization.

After 12 hours of curing, 2.5 kg of a preparation that may be used for textile treatment were obtained. The preparation has a pH of 10.5, a dry extract of 19.7% and a viscosity of 4.4 mPa·s.

The same method was applied to produce 2 compositions containing benzaldehyde and 1 other composition containing 4-hydroxybenzaldehyde, varying the following parameters:

Mass ratio of hardener/lignosulfonate salt: 88% to 102%.

Mass ratio of [lignosulfonate salt+hardener]/latex: from 20% to 29%.

% by mass of dry latex in the composition: from 78% to 82%.

In total, 4 compositions were produced.

Example I-3: Another Method of Preparing an Adhesive Based on Benzaldehyde, 4-hydroxybenzaldehyde or 3-hydroxybenzaldehyde, in the Presence of Several Bases In another embodiment of the invention, a basic solution of sodium lignosulfonate is prepared by dissolving 30 g of sodium lignosulfonate with stirring in 968 g of water and adding 30 g of a sodium hydroxide solution at 10% by mass. The preparation is left under stirring at 200 rpm for 10 minutes in order to allow total solubilization.

A basic latex dispersion is prepared by introducing 167 g of water into a container, which is then stirred at 200 rpm. 1050 g of a styrene-butadiene copolymer (SBR) latex, then 26 g of an ammonia solution at 20% by mass are then introduced successively. The basic lignosulfonate solution is then added with stirring to the latex dispersion.

36 g of 4-hydroxybenzaldehyde are stirred vigorously (300 rpm) and 193 g of water are added slowly to form a milky emulsion. This emulsion is immediately added with stirring to the preparation of lignosulfonate and latex. Stirring is maintained for a few minutes until complete homogenization.

After 12 hours of curing, 2.5 kg of a preparation that may be used for textile treatment were obtained. The preparation has a pH of 9.8, a dry extract of 19.8% and a viscosity of 3.5 mPa·s.

The same method was used to produce 3 compositions containing benzaldehyde, 2 other compositions containing 4-hydroxybenzaldehyde and 3 compositions containing 3-hydroxybenzaldehyde, varying the following parameters:

Mass ratio of hardener/lignosulfonate salt: 105% to 241%
Mass ratio of [lignosulfonate salt+hardener]/latex: from 15% to 45%
% by mass of dry latex in the composition: from 68% to 86%.

In total, 9 compositions were produced.

Example I-4: Method of Preparing a Diluted Adhesive with Additives, Based on Benzaldehyde In another embodiment of the invention, a basic solution of sodium lignosulfonate is prepared by dissolving 33 g of sodium lignosulfonate with stirring in 1059 g of water and adding 32 g of a 10% by mass sodium hydroxide solution. The preparation is left under stirring at 200 rpm for 10 minutes in order to allow total solubilization.

A basic latex dispersion is prepared by introducing 155 g of water into a container, which is then stirred at 200 rpm. 1050 g of styrene-butadiene copolymer latex (SBR), then 26 g of an ammonia solution at 20% by mass are then introduced successively. The basic lignosulfonate solution is then added with stirring to the latex dispersion.

34 g of benzaldehyde are stirred vigorously (300 rpm) and 112 grams of water are added slowly to form a milky emulsion. This emulsion is immediately added with stirring to the preparation of lignosulfonate and latex. Stirring is maintained for a few minutes until complete homogenization.

819 g of this preparation are then taken and introduced with stirring into 1658 g of water. 17 g of an adhesion promoter (blocked isocyanate) in aqueous phase and 6.4 g of wax (microcrystalline hydrocarbon wax in emulsion) are then added with stirring.

After 12 hours of curing, 2.5 kg of a preparation that may be used for textile treatment were obtained. The preparation has a pH of 11.5, a dry extract of 6.9% and a viscosity of 1.6 mPa·s.

Example I-5: "One-Pot" Method of Preparation of an Adhesive Based on Potassium Lignosulphonate and Various Hardeners In this method of preparation, 136 g of an aqueous solution of potassium lignosulfonate and 43 g of 3-hydroxybenzaldehyde are mixed thoroughly. 1776 g of water are then poured over the mixture with vigorous stirring. 34 g of a 10% by mass sodium hydroxide solution and 168 g of a 20% by mass ammonia solution are then successively added to the preparation with stirring. The mixture is left under stirring for 10 minutes, then added with stirring to a dispersion of chloroprene latex (wet latex CR; 1004 g) in water (173 g).

After 12 hours of curing, 3.5 kg of a preparation that may be used for textile methoding was obtained. The preparation has a pH of 10.8, a solids content of 20.2% and a viscosity of 2.2 mPa·s.

The same method was applied to produce 1 composition containing benzaldehyde, 2 compositions containing 4-hydroxybenzaldehyde and 1 other composition containing 3-hydroxybenzaldehyde, varying the following parameters:

Mass ratio of hardener/lignosulfonate salt: 13% to 64%
Mass ratio of [lignosulfonate salt+hardener/latex]: from 20% to 47%
% by mass of dry latex in the composition: from 64% to 79%.

In total, 5 compositions were produced.

Example I-6: "One-Pot" Method of Preparation of an Adhesive with High Additives and with Different Hardeners In this method of preparation, 194 g of an aqueous solution of potassium lignosulfonate and 15 g of 3-hydroxybenzaldehyde are mixed thoroughly. 1746 g of water are then poured over the mixture with vigorous stirring. 36 g of a 10% by mass sodium hydroxide solution and 169 g of a 20% by mass ammonia solution are then successively added to the preparation with stirring. The mixture is left under stirring for 10 minutes, then added with stirring to a dispersion of chloroprene latex (wet latex CR; 1004 g) in water (182 g).

1306 g of this preparation are taken and diluted with stirring in 996 g of water. 38 g of an aqueous dispersion of zinc oxide at 60% by mass, 78 g of an aqueous dispersion of carbon black at 35% by mass and 83 g of an adhesion promoter (blocked isocyanate) are then successively added with moderate stirring.

After 12 hours of curing, 2.5 kg of a preparation that may be used for textile treatment were obtained. The preparation has a pH of 11.5, a dry extract of 14.1% and a viscosity of 2.2 mPa·s.

The same method was applied to produce 3 compositions containing benzaldehyde, 2 compositions containing 4-hydroxybenzaldehyde and 1 other composition containing 3-hydroxybenzaldehyde, varying the following parameters:

Mass ratio of hardener/lignosulfonate salt: 13% to 64%
Mass ratio of [lignosulfonate salt+hardener]/latex: from 20% to 47%
% by mass of dry latex in the composition: from 48% to 59%

In total, 9 compositions were produced.

II—Part Treatment of the Reinforcement Textile

The definitions and measurement or control methods described in this part are generally applicable on demand, unless otherwise specified. The mechanical characteristics of the treated textiles, such as tensile strength at break, tensile elongation at break, shrinkage, temperature shrinkage, steaming shrinkage, temperature shrinkage force, linear weight, load rate (Dip pick-up; DPU), stiffness, etc., are measured according to the standards in force in the textile industry. The inventors set out to verify that the new treatments did not lead to any modification of these properties, compared to standard RFL.

The adhesive preparations of the invention are evaluated for their adhesion performance. After coating the textile, the latter is deposited in an unvulcanized rubber matrix, so that the surface of the textile in contact with the rubber remains free of any pollution. The matrix containing the textile is then vulcanized by compression, according to temperature, time and pressure conditions specific to each rubber. The textile+vulcanized matrix assembly forms an adhesion test piece.

The adhesion test pieces may take several forms, described in various international standards, such as ISO 36: 2017. The test pieces, and by extension the test carried out to determine the adhesion, are commonly known to those skilled in the art under other names such as Test-T ("pull-out test", ASTM D2229-04), Test-H (according to standard NF ISO 4647 or ASTM D4776-04), peeling (peel-test) . . . . The test is then carried out by stressing the specimen until destruction of the interfacial contact zone, of the tearing of the textile, or tearing of the rubber matrix. The adhesion is then evaluated according to criteria such as the appearance of the textile at break, the maximum adhesion force, the average tear-off force, possibly reduced to the thickness of the test piece.

General Information on Impregnation Methods

In general, the textile impregnation method is carried out by soaking (dipping) in trays containing the adhesive preparations. A scheme of such a method is illustrated in Gomes A., Nabih N., Kramer T, Adhesion activation of tire textiles by resorcinol formaldehyde free coatings, Rubber World, March 2016.

The coil(s) of untreated yarns, cords and cables may be positioned on a creel at the line entry. An accumulator system may optionally be used. The yarns, cords and cables may be either directly dipped in a tub or impregnated by a lick roller, for the application of the bonding composition. After soaking or impregnation, the excess wet preparation is preferably removed, for example by pressing (padding), suction or by foams. Drying and/or crosslinking of the bonding composition is then carried out. The coated impregnated textile may be passed through an oven to allow drying and crosslinking of the bonding composition. After removal from an oven, the textile may again undergo an impregnation step, then passage through an oven, these steps being able to be repeated, in particular up to a total of 4 impregnations (2, 3 or 4). On leaving the line, the yarns, cords or cables may be received on winders.

In another method of impregnation, particularly suitable for mineral fibers (glass, basalt, carbon, etc.), a derivation system made up of a comb and/or "pig tails" may be used at the creel outlet. It allows maximum opening of the multi-filament yarn, to promote strong impregnation. After the impregnation and drying and/or crosslinking steps, the yarn is then twisted in line. The twisting is preferably carried out on an already treated yarn. Additional treatments may be carried out on the cords thus formed.

In the different methods, the speeds may range from 1 m/min to 150 m/min, the temperatures of the ovens from 30° C. to 350° C., more specifically from 100 to 300° C., and even more specifically from 140 to 220°. Mechanical tension may also be applied to the textile. Unless otherwise indicated, in the following examples, the textiles were treated with the bonding compositions object of the invention under conditions identical to those applied during a treatment with an RFL.

Example II-1

In an example of preparation of the invention, the inventors set out to present a solution which may be used as a reinforcement, braided, coiled, wrapped or knitted in a brake pipe. For this, a 95 Z twist was applied to a polyethylene terephthalate (PET) yarn with a titre of 1100 dtex.

The yarn obtained was treated by an impregnation in the adhesive object of the invention, then by heat setting in an oven. The adhesives used in this example have a solids concentration of 20%.

The different yarns impregnated with the adhesive were evaluated for adhesion on 2 rubber mixtures conventionally used in brake pipes. The first is an EPDM mixture accelerated with peroxide, hardness 90 Shore A. The second is an EPDM mixture of hardness 90 Shore A vulcanized with sulfur. The test pieces were produced by compression molding. A yarn impregnated with RFL, produced under the same conditions, obtained the control adhesion values.

The PET yarn treated with the different adhesives of each of Examples I-1, I-2 and I-3 showed satisfactory levels of adhesion compared to the RFL impregnated control yarn. The values obtained are presented in Table 1, and expressed as % adhesion relative to the adhesion obtained with the control RFL yarn.

TABLE I adhesions obtained for a treated PET for pipes.

| Adhesion (in % vs adhesion of the RFL control) | Treated PET yarn + EPDM peroxide | Treated PET yarn + EPDM Sulfur |
|---|---|---|
| The 9 adhesives of example I-1 | 110 to 135% | 85 to 108% |
| The 4 adhesives of example I-2 | 134 to 142% | 155 to 168% |
| The 9 adhesives of example I-3 | 75 to 105% | Not evaluated |

Example II-2

In an example of preparation of the invention, the inventors have endeavored to present a solution which may be used as a reinforcement in assemblies such as transmission belts or conveyor belts. Such reinforcements require a first treatment aimed at limiting unraveling during exposure on the edge.

For this, a cable in PA 4-6 of construction 470/5×3 dtex (100/125) was built by successive stages of twisting, then cabling. The cord obtained was treated by a first impregnation in a solution of methylene diphenyl diisocyanate in toluene, then subjected to drying and heat setting in an oven. The cord was then impregnated in a tank containing the adhesive of the invention, at a dry matter mass concentration of 20%, instead of the RFL treatment usually applied.

The different yarns impregnated with the different adhesives obtained were evaluated for adhesion on 2 rubber mixtures which may be used for the manufacture of belts. The first is a blend of accelerated peroxide EPDM. The second is a mixture based on CR vulcanized with metal oxides. The test pieces were produced by compression molding. A yarn impregnated with RFL, produced under the same conditions, obtained the control adhesion values.

The Polyamide 4-6 cord treated with the different adhesives of Examples I-1, I-2 and I-3 showed satisfactory levels of adhesion to EPDM compared to the RFL impregnated control yarn. The polyamide 4-6 yarn treated with the various adhesives of Example I-5 showed satisfactory levels of adhesion to the CR mixture. The adhesion levels obtained, as well as the observation of the fracture characteristics show that the adhesives evaluated are compatible with the first treatment applied to the textile.

The adhesion values obtained are presented in Table II, and expressed as % adhesion relative to the adhesion obtained with the control RFL yarn.

TABLE II adhesions obtained for a PA 4-6 treated for belts.

| Adhesion (in % vs adhesion of the RFL control) | Treated PA yarn + EPDM | Treated PA yarn + CR |
|---|---|---|
| The 9 adhesives of Example I-1 | 143 to 163% | |
| The 4 adhesives of example I-2 | 98 to 118% | |

TABLE II-continued adhesions obtained for a PA 4-6 treated for belts.

| Adhesion (in % vs adhesion of the RFL control) | Treated PA yarn + EPDM | Treated PA yarn + CR |
|---|---|---|
| The 9 adhesives of Example I-3 | 77 to 107% | |
| The 5 adhesives of Example I-5 | | 81 to 96% |

Example II-3

In an example of preparation of the invention, the inventors set out to present an invention which may be used as a reinforcement in profiles and seals, such as window or door seals. Such reinforcements are made from glass yarn containing a size with which the bonding composition must be compatible.

To do this, several E-glass yarns of 136 tex strength underwent derompage and impregnation in the tray containing the adhesive of the invention, instead of the RFL. In this example, adhesives with a mass concentration of 7-20% were evaluated. The impregnated yarns were subjected to drying and heat setting in an oven. On leaving the oven, the yarns have undergone a twisting operation giving them a twist of 135 turns/meter in the Z direction. Three impregnated twists are then twisted together in one direction and at a 135 S level. The glass yarns thus treated showed no visual damage or caused excessive fouling on the processing lines. This shows the ability of the adhesives evaluated to impart identical properties to RFL, including mechanical protection properties.

The various yarns impregnated with the various adhesives obtained were evaluated for adhesion to an EPDM rubber mixture conventionally used by extrusion. A yarn impregnated with RFL, produced under the same conditions, obtained the control adhesion values.

The E-glass cord treated with the different adhesives of Examples I-2, I-3 and I-4 showed satisfactory adhesion levels to EPDM compared to the RFL impregnated control yarn. The adhesion levels obtained, as well as the observation of the fracture patterns show that the adhesives evaluated are compatible with the glass sizing.

The adhesion values obtained are presented in Table III, and expressed as % adhesion relative to the adhesion obtained with the control RFL yarn.

TABLE III adhesions obtained for a treated glass for profiles.

| Adhesion (in % vs. adhesion of the RFL control) | Treated PA yarn + EPDM |
|---|---|
| The 4 adhesives of example I-2 (mass concentration 20%) | 90 to 116% |
| The 9 adhesives of example I-3 (mass concentration 20%) | 65 to 155% |
| Adhesive example I-4 (mass concentration 7%) | 122% |

Example II-4

In an example of preparation of the invention, the inventors set out to present an invention which may be used as a radial reinforcement in tires. Such reinforcements consist of a p-aramid yarn requiring a prior treatment, called activation, to allow it to obtain the required levels of adhesion. For this, a p-aramid cord of construction 1680/1×3 dtex (240/240) was constructed by successive stages of twisting, then cabling. The cord obtained was treated by a first impregnation in an aqueous preparation called "activation" based on polyepoxides, then subjected to drying and heat setting in an oven. The cord was then impregnated in a tray containing the adhesive of the invention, at a dry matter concentration by mass of 7 to 20%, instead of the RFL treatment usually applied. The cords thus treated showed a visual appearance of remarkable uniformity, demonstrating good compatibility between the adhesive treatment according to the invention and the preactivation treatment.

The different yarns impregnated with the different adhesives obtained were evaluated for adhesion to a rubber mixture based on a blend of SBR and NR which may be used in "heavy-duty" tires. A yarn impregnated with RFL, produced under the same conditions, obtained the control adhesion values.

The p-aramid cords treated with the adhesives of Examples I-1 to I-4 showed satisfactory levels of adhesion to rubber compared to the RFL impregnated control yarn. The p-aramid cords treated with the adhesives of Examples I-2 and I-3 showed adhesion levels which were lower than the level of adhesion usually required for this type of application, but which remain remarkable with a value greater than 15 N/mm. Observation of the fracture patterns confirms these levels, by the presence of residual rubber on the textile.

The adhesion values obtained are presented in Table IV, and expressed as % adhesion relative to the adhesion obtained with the control RFL yarn

TABLE IV adhesions obtained for an aramid treated for tires.

| hesion (in % vs adhesion of the RFL control) | AdMacaw yarn treated + SBR/NR |
|---|---|
| The 9 adhesives of Example I-1 (mass concentration 20%) | 120-138% |
| The 4 adhesives of example I-2 (mass concentration 20%) | 45-100% |
| The 9 adhesives of example I-3 (mass concentration 20%) | 53-132% |
| The adhesive of Example I-4 (mass concentration 7%) | 94% |

Example III

Unless stated otherwise, the aluminum cups used have a diameter of 43 mm and a depth of 12 mm.

The glass transition temperature is measured by differential scanning calorimetry using DSC 3+STAR$^e$ SYSTEM equipment from METTLER TOLEDO. The measured glass transition temperature is the temperature located at the midpoint of the glass transition. The sample is placed in the DSC equipment under a flow of nitrogen at 80 ml per minute. It is then subjected to baking at 25 to 190° C. (20° C. per minute), then cooling from 190° C. to 25° C. (20° C. per minute), holding at 25° C. for 5 minutes, then a second rise from 25° C. to 300° C. (20° C. per minute) during which the glass transition of the baked product is measured.

III1—Part Examples of Preparation of Formula Comprising a Lignosulfonate Salt and an Aldehyde Hardener Example III-1-1 (Comparative): Preparation of a Formula Comprising a Lignosulfonate Salt in the Presence of Sodium Hydroxide and in the Absence of an Aldehyde Hardener 40 g of sodium lignosulfonate (Arbo N18; Tembec) are dissolved with stirring in 59 g of water and 1 g of a 10% mass sodium hydroxide solution. The solution is maintained for 10 minutes with stirring to allow complete solubilization.

A few grams of the composition are introduced into an aluminum cup which is placed under a hood at room temperature for 24 hours, then in an oven at 105° C. for 15 minutes and then heat in the oven at 180° C. and stabilization for 5 minutes at 180° C., making it possible to obtain a baked product.

This baked product is then placed in the DSC equipment to measure the glass transition temperature as explained above.

The measured glass transition temperature is 155° C. with an accuracy of ±1° C.

Example III-1-2 (Comparative): Preparation of a Formula Comprising a Lignosulfonate Salt in the Presence of Ammonia and in the Absence of an Aldehyde Hardener 40 g of sodium lignosulfonate (Arbo N18; Tembec) are dissolved with stirring in 55 g of water and 5 g of 20% by mass ammonia solution. The solution is maintained for 10 minutes with stirring to allow complete solubilization.

A few grams of the composition are introduced into an aluminum cup which is placed under a hood at room temperature for 24 hours, then in an oven at 105° C. for 15 minutes and then heated in the oven at 180° C. and stabilization for 5 minutes at 180° C., making it possible to obtain a baked product.

This fired product is then placed in the DSC equipment to measure the glass transition temperature as explained above.

The measured glass transition temperature is 160° C. with an accuracy of ±1° C.

Example III-1-3: Preparation of a Formula Comprising a Lignosulfonate Salt in the Presence of Sodium Hydroxide and in the Presence of an Aldehyde Hardener 60 g of sodium lignosulfonate (Arbo N18; Tembec) are dissolved with stirring in 177 g of water and 3 g of a 10% mass sodium hydroxide solution. The solution is maintained for 10 minutes with stirring to allow complete solubilization. 60 g of benzaldehyde are then added to the lignosulfonate preparation and stirred until complete homogenization.

A few grams of the composition are introduced into an aluminum cup which is placed under a hood at room temperature for 24 hours, then in an oven at 105° C. for 15 minutes and then heated in the oven at 180° C. and stabilization for 5 minutes at 180° C., making it possible to obtain a baked product.

This baked product is then placed in the DSC equipment to measure the glass transition temperature as explained above.

The same method was applied to produce 2 other compositions containing benzaldehyde, 2 compositions containing trans-2-hexenal, 2 compositions containing 2-methylbutyraldehyde, 2 compositions containing salicylaldehyde, 2 compositions containing 7-hydroxy-3,7-dimethyl-octanal, 2 compositions containing cyclohexanecarboxaldehyde, 2 compositions containing 3-chlorobenzaldehyde and 2 compositions containing 4-ethylbenzaldehyde, by varying the hardener/lignosulfonate salt mass ratio from 50% to 150%.

In total, 17 products were produced.

| | Hardener/lignosulfonate salt mass ratio | | |
|---|---|---|---|
| | 0.5 | 1.0 | 1.5 |
| trans-2-hexenal | X | | X |
| 2-méthylbutyraldéhyde | X | | X |
| salicylaldéhyde | X | | X |
| 7-hydroxy-3,7-dimethyl-octanal | X | | X |
| cyclohexanal | X | | X |
| benzaldéhyde | X | X | X |
| 3-chlorobenzaldéhyde | X | | X |
| 4-éthylbenzaldéhyde | X | | X |

These baked products exhibit glass transition temperatures higher than the glass transition temperature of the control baked product of Example III-1-1. This increase in the glass transition temperature over the control demonstrates that the aldehyde has hardened the lignosulfonate salt.

| Increase in the glass transition temperature (in % vs glass transition temperature of the control from Example 1-1) | Baked product |
|---|---|
| The 17 compositions | 102 to 115% |

Example III-1-4: Preparation of a Formula Comprising a Lignosulfonate Salt in the Presence of Ammonia and in the Presence of an Aldehyde Hardener Preparation of a Formula Comprising a Lignosulfonate Salt and a Benzaldehyde Hardener 60 g of sodium lignosulfonate (Arbo N18; Tembec) are dissolved with stirring in 165 g of water and 15 g of an ammonia solution at 20% by mass. The solution is maintained for 10 minutes with stirring to allow complete solubilization. 60 g of benzaldehyde are then added to the lignosulfonate preparation and stirred until complete homogenization.

A few grams of the composition are introduced into an aluminum cup which is placed under a hood at room temperature for 24 hours, then in an oven at 105° C. for 15 minutes and then heated in the oven at 180° C. and stabilization for 5 minutes at 180° C., making it possible to obtain a baked product.

This fired product is then placed in the DSC equipment to measure the glass transition temperature as explained above.

The same method was applied to produce 2 other compositions containing benzaldehyde, 2 compositions containing trans-2-hexenal, 2 compositions containing 2-methylbutyraldehyde, 2 compositions containing salicylaldehyde, 2 compositions containing 7-hydroxy-3,7-dimethyl-octanal, 2 compositions containing cyclohexanecarboxaldehyde, 2 compositions containing chlorobenzaldehyde and 2 compositions containing 4-ethylbenzaldehyde, by varying the hardener/lignosulfonate salt mass ratio from 50% to 150%.

A total of 19 products were produced.

|  | Hardener/lignosulfonate salt mass ratio | | |
| --- | --- | --- | --- |
|  | 0.5 | 1.0 | 1.5 |
| trans-2-hexenal | X |  | X |
| 2-méthylbutyraldéhyde | X |  | X |
| salicylaldéhyde | X |  | X |
| 7-hydroxy-3,7-dimethyl-octanal | X |  | X |
| cyclohexanal | X |  | X |
| benzaldéhyde | X | X | X |
| 3-chlorobenzaldéhyde | X |  | X |
| 4-éthylbenzaldéhyde | X |  | X |

These baked products exhibit glass transition temperatures greater than the glass transition temperature of the control baked product of Example III-1-2. This increase in the glass transition temperature over the control demonstrates that the aldehyde has hardened the lignosulfonate salt.

| Increase in the glass transition temperature (in % vs glass transition temperature of the control from Example 1-1) | Baked product |
| --- | --- |
| L The 17 compositions | 102 to 123% |

III—2—Part Examples of Preparation of Adhesive Formula

Example III-2-1: Preparation of an Adhesive Based on Styrene-Butadiene-Vinylpyridine Copolymer Latex (VPSBR)

127.1 g of water and 37.5 g of the composition of Example 1-3 are added with stirring to 85.4 g of a styrene-butadiene-vinylpyridine copolymer latex comprising 35.0 g of dry VPSBR and 50.4 g of water. Stirring is maintained for a few minutes until complete homogenization. After 12 hours of curing, 250 g of a preparation that may be used for the textile treatment were obtained. The preparation has a pH of 9.7, a dry extract of 16.5% and a viscosity of 2.7 cP.

The same method was applied to produce 37 other compositions from all of the compositions of Example 1-3 and Example 1-4. Among these compositions, 6 contain benzaldehyde, 4 compositions contain trans-2-hexenal, 4 compositions contain 2-methylbutyraldehyde, 4 compositions contain salicylaldehyde, 4 compositions contain 7-hydroxy-3,7-dimethyl-octanal, 4 compositions contain cyclohexanecarboxaldehyde, 4 compositions contain chlorobenzaldehyde and 4 compositions contain 4-ethylbenzaldehyde, and vary the following parameters:

% by mass of dry latex in the composition: approximately 70%
Mass ratio of hardener/lignosulfonate salt: 50 to 150%
Mass ratio of (lignosulfonate salt+hardener)/latex: about 43%

In total, 34 compositions were produced and have the following characteristics:
pH 7.8 to 10.4
viscosity of 1.9 to 3.0 cP Example III-2-2: Preparation of an Adhesive Based on Chloroprene Latex (CR)

153.2 g of water and 37.5 g of the composition of Example 1-3 are added with stirring to 59.3 g of a chloroprene latex comprising 35.0 g of dry CR and 24.3 g of water. Stirring is maintained for a few minutes until complete homogenization. After 12 hours of curing, 250 g of a preparation that may be used for the textile treatment were obtained. The preparation has a pH of 10, a dry extract of 17.4% and a viscosity of 2.1 cP.

The same method was applied to produce 37 other compositions from all of the compositions of Example 1-3 and Example 1-4. Among these compositions, 6 contain benzaldehyde, 4 compositions contain trans-2-hexenal, 4 compositions contain 2-methylbutyraldehyde, 4 compositions contain salicylaldehyde, 4 compositions contain 7-hydroxy-3,7-dimethyl-octanal, 4 compositions contain cyclohexanecarboxaldehyde, 4 compositions contain chlorobenzaldehyde and 4 compositions contain 4-ethylbenzaldehyde, and vary the following parameters:

% by mass of dry latex in the composition: approximately 70%
Mass ratio of hardener/lignosulfonate salt: 50 to 150%
Mass ratio (lignosulfonate salt+hardener)/latex: about 43%

In total, 34 compositions were produced and have the following characteristics:
pH from 7.9 to 10.4
viscosity from 1.7 to 2.6 cP Example III-2-3: Preparation of an Adhesive Based on Styrene-Butadiene Copolymer Latex (SBR)

127.1 g of water and 37.5 g of the composition of Example 1-3 are added with stirring to 85.4 g of a styrene-butadiene copolymer latex comprising 35.0 g of dry SBR and 50.4 g of water. Stirring is maintained for a few minutes until complete homogenization. After 12 hours of curing, 250 g of a preparation that may be used for the textile treatment were obtained. The preparation has a pH of 9.1, a dry extract of 16.7% and a viscosity of 2.1 cP.

The same method was applied to produce 37 other compositions from all of the compositions of Example 1-3 and Example 1-4. Among these compositions, 6 contain benzaldehyde, 4 compositions contain trans-2-hexenal, 4 compositions contain 2-methylbutyraldehyde, 4 compositions contain salicylaldehyde, 4 compositions contain 7-hydroxy-3,7-dimethyl-octanal, 4 compositions contain cyclohexanecarboxaldehyde, 4 compositions contain chlorobenzaldehyde and 4 compositions contain 4-ethylbenzaldehyde, and vary the following parameters:

% by mass of dry latex in the composition: approximately 70%
Mass ratio of hardener/lignosulfonate salt: 50 to 150%
Mass ratio of (lignosulfonate salt+hardener)/latex: about 43%

In total, 34 compositions were produced and have the following characteristics:
pH 7.7 to 10.2
viscosity from 2.0 to 3.1 cP Example III-2-4: Preparation of an Adhesive Based on Latex of Butadiene-Acrylonitrile Copolymer (NBR)

138.0 g of water and 37.5 g of the composition of Example 1-3 are added with stirring to 74.5 g of a latex of butadiene-acrylonitrile copolymer comprising 35.0 g of dry NBR and 39.5 g of water. Stirring is maintained for a few minutes until complete homogenization. After 12 hours of curing, 250 g of a preparation that may be used for the textile treatment were obtained. The preparation has a pH of 9.7, a solids content of 17.5% and a viscosity of 2.6 cP.

The same method was applied to produce 37 other compositions from all of the compositions of Example 1-3 and Example 1-4. Among these compositions, 6 contain benzaldehyde, 4 compositions contain trans-2-hexenal, 4 compositions contain 2-methylbutyraldehyde, 4 compositions contain salicylaldehyde, 4 compositions contain 7-hydroxy-3,7-dimethyl-octanal, 4 compositions contain cyclohexanecarboxaldehyde, 4 compositions contain chlorobenzaldehyde and 4 compositions contain 4-ethylbenzaldehyde, and vary the following parameters:

% by mass of dry latex in the composition: approximately 70%

Mass ratio of hardener/lignosulfonate salt: 50 to 150%

Mass ratio of (lignosulfonate salt+hardener)/latex: about 43%

In total, 34 compositions were produced and have the following characteristics:

pH 7.8 to 10.1 viscosity from 2.1 to 3.0 cP

The invention claimed is:

1. A bonding composition for textiles, comprising a resin consisting essentially of a product of a reaction between a salt of lignosulfonate and an aldehyde hardener thereof, and an elastomer latex, the aldehyde having at least 2 carbon atoms, wherein the bonding composition does not include resorcinol.

2. The bonding composition according to claim 1, wherein the hardener is a monoaldehyde compound containing an aldehyde group placed at the end of a hydrocarbon chain, so that the maximum length of the main carbon chain is less than or equal to 20 carbon atoms, the chain being linear, branched or cyclic; a dialdehyde compound containing 2 aldehyde groups so that the aldehyde groups are placed at the end of a hydrocarbon chain, so that the maximum length of the main carbon chain is less than or equal to 20 carbon atoms; a trialdehyde; or a polyaldehyde formed from a polymer chain containing non-enolized aldehyde units.

3. The bonding composition according to claim 2, wherein the aldehyde is selected from the group consisting of acetaldehyde; priopionaldehyde; butyraldehyde; pentanal (valeraldehyde); hexanal; heptanal; octanal; nonanal; decanal; undecanal; dodecanal; tridecanal; tetradecanal (myristaldehyde); 2-butenal (crotonaldehyde); 3-butenal; 2-hexenal; 3-hexenal; 2-heptenal; 3-heptenal; 5-heptenal; 2-octenal; 2,4-pentadienal; 2,4-hexadienal; 2,4-heptadienal; 3,5-heptadienal; 2,4-octadienal; isobutyraldehyde; isovaleraldehyde; 2-methylbutyraldehyde; 3,5,5-trimethylhexanal; trimethylacetaldehyde; phenylacetaldehyde; 3-phenylpropionaldehyde (hydrocinnamaldehyde); 2-phenylpropionaldehyde (hydratropaldehyde); 2-Methyl-3-(p-isopropylphenyl) propionaldehyde (cyclamen aldehyde); hydrocinnamaldehyde; 2-Methylbut-2-enal (tiglic aldehyde); 2,6-dimethyl-5-heptenal (melonal); 2-methyl-2-pentenal; a-hexylcinnamaldehyde; a-amylcinnamaldehyde; cinnamaldehyde; a-hexylcinnamaldehyde; a-amylcinnamaldehyde; phenylcinnamaldehyde; methylcinnamaldehyde and positional isomers; 7-Hydroxy-3,7-dimethyl-octanal (Hydroxycitronellal); D-erythrosis; benzyloxyacetaldehyde; 2-Hydroxycinnamaldehyde; 4-Hydroxycinnamaldehyde; 2-Methoxycinnamaldehyde; 3,5-Dimethoxy-4-hydroxycinnamaldehyde (Sinapinaldehyde); 4-Acetoxy-3-methoxycinnamaldehyde; 4-Hydroxy-3-methoxycinnamaldehyde (coniferaldhyde); 4-Chlorocinnamaldehyde; 4-Bromocinnamaldehyde; 4-Fluorocinnamaldehyde; 2,6-Difluorocinnamaldehyde; cyclopentanal; cyclopropanal; cyclohexanal; cycloheptenal; cyclooctanal; benzaldehyde; Chloro: 4-chlorobenzaldehyde; 3-chlorobenzaldehyde; 2-Chlorobenzaldehyde; 2,4-dichlorobenzaldehyde; 2,5-dichlorobenzaldehyde; 2,6-dichlorobenzaldehyde; 3,5-dichlorobenzaldehyde; 2,3,6-trichlorobenzaldehyde; 2-bromobenzaldehyde; 3-bromobenzaldehyde; 4-bromobenzaldehyde; 3,4-dibromobenzaldehyde; 3,5-dibromobenzaldehyde; 2,5-dibromobenzaldehyde; 2-iodobenzaldehyde; 3-iodobenzaldehyde; 4-iodobenzaldehyde; 2-methylbenzaldehyde; 3-methylbenzaldehyde; 4-methylbenzaldehyde (o-m-p-isomers of tolualdehyde); 2,4-Dimethylbenzaldehyde; 2,5-dimethylbenzaldehyde; 2,6-dimethylbenzaldehyde; 2,4,6-trimethylbenzaldehyde (mesitaldehyde); 4-ethylbenzaldehyde; 2-ethylbenzaldehyde; Biphenyl-2carboxaldehyde; Biphenyl-3-carboxaldeyde; biphenyl-4-carboxaldehyde; 2,5-di-tertbutyl-benzaldehyde; 4-tertbutylbenzaldehyde; 4-isopropylbenzaldehyde (cuminaldehyde); Isomers of anisaldehyde: 2-methoxybenzaldehyde; 3-methoxybenzaldehyde and 4-methoxybenzaldehyde; isomers of veratraldehyde: 2,3-dimethoxybenzaldehyde; 2,4-dimethoxybenzaldehyde; 2,5-dimethoxybenzaldehyde; 2,6-dimethoxybenzaldehyde; 3,4-dimethoxybenzaldehyde; 3,5-dimethoxybenzaldehyde; 2-ethoxybenzaldehyde; 3-ethoxybenzaldehyde; 4-ethoxybenzaldehyde; 3,4-ethoxybenzaldehyde; 3-phenoxybenzaldehyde; 4-phenoxybenzaldehyde; 2-benzyloxybenzaldehyde; 3-benzyloxybenzaldehyde; 4-benzyloxybenzaldehyde; 2-hydroxybenzaldehyde (salicylaldehyde); 3-hydroxybenzaldehyde; 4-hydroxybenzaldehyde; 2,3-dihydroxybenzaldehyde; 2,4-dihydroxybenzaldehyde; 2,5-dihydroxybenzaldehyde (gentisaldehyde); 3,4-dihydroxybenzaldehyde; 3,4,5-trihydroxybenzaldehyde; 2,4,5-trihydroxybenzaldehyde; 2,3,4-trihydroxybenzaldehyde; 2,4,6-trihydroxybenzaldehyde (phloroglucinaldehyde); 2-hydroxy-3-methoxybenzaldehyde; 2-hydroxy-4-methoxybenzaldehyde; 3-hydroxy-4-methoxybenzaldehyde (isovanillin); 4-hydroxy-2-methoxybenzaldehyde; 4-Hydroxy-3-methoxybenzaldehyde (vanillin); 2,6-dimethoxy-4-hydroxybenzaldehyde; 3,4-dimethoxy-5-hydroxybenzaldehyde; 3,5-dimethoxy-4-hydroxybenzaldehyde (syringaldehyde); 4-ethoxy-3-methoxybenzaldehyde; 3-ethoxy-4-methoxybenzaldehyde; 2-ethoxy-3-methoxybenzaldehyde; 2-benzoyloxy-3-methoxybenzaldehyde; 3-benzoyloxy-4-methoxybenzaldehyde; 4-benzoyloxy-3-methoxybenzaldehyde; Myristicin aldehyde; 2-pyridinecarboxaldehyde; 3-pyridinecarboxaldehyde; 4-pyridinecarboxaldehyde; 2-Thiazolecarboxaldehyde; pyrrol-2-carboxaldehyde; 3-thiophenecarboxaldehyde; indol-3-carboxaldehyde; 3-methyl-2-thiophene carboxaldehyde; 6-methylpyridinecarboxaldehyde; N-benzylpyridine-4-carboxaldehyde; 1-methylimidazolecarboxaldehyde; glutaraldehyde; bromomalonaldehyde; terephthalaldehyde; o-Phthalaldehyde; m-Phthalaldehyde; 4-(4-formylphenoxy) benzaldehyde; 4-(2-formylphenoxy) benzaldehyde; and Tris (4-formylphenyl) amine.

4. The bonding composition according to claim 1, comprising a latex of acrylonitrile/carboxylated butadiene copolymer (XNBR), a latex of acrylonitrile/hydrogenated butadiene (HNBR), a latex of chlorosulfonated polyethylene (CSM), a latex of styrene-butadiene-vinylpyridine copolymer (VPSBR), a latex of styrene/butadiene copolymer (SBR), an acrylonitrile/butadiene copolymer latex (NBR), a polybutadiene (BR) latex, a chlorobutadiene (CR) latex, a natural rubber latex (NR), a polyurethane latex, or a mixture of at least two of them.

5. The bonding composition according to claim 1, wherein the mass content of dry matter of the composition is between approximately 2 and approximately 38%.

6. The bonding composition according to claim 1 comprising from about 40 to about 95% by weight of elastomer based on the composition.

7. The bonding composition according to claim 1, wherein the hardener/lignosulphonate salt mass ratio is between approximately 0.1 and approximately 3.

8. The bonding composition according to claim 1, in which the mass ratio of [hardener+lignosulfonate salt]/latex is between approximately 0.05 and approximately 0.6.

9. A reinforcement textile comprising a textile at least partially coated and/or impregnated with the bonding composition according to claim 1.

10. A rubber part or a part comprising a rubber, wherein the rubber part or part comprising a rubber comprises at least one reinforcement textile according to claim 9, on the surface and/or integrated within the rubber part or the part comprising a rubber.

11. The rubber part or a part comprising a rubber according to claim 10, wherein the rubber part or a part comprising a rubber is an article selected from the group consisting of a belt, a flexible or rigid hose, a pneumatic spring, a kinetic coupling disc, a pipe plug, a compensation joint, and a tire.

12. The reinforcement textile according to claim 9, wherein the textile is a yarn, a cord, or a textile structure.

13. The bonding composition according to claim 1, wherein the aldehyde is a monoaldehyde or a dialdehyde with a main carbon chain having from 2 to 20 carbon atoms, and wherein the aldehyde group in the monoaldehyde and the aldehyde groups in the dialdehyde is/are placed at the end of said main hydrocarbon chain.

14. The bonding composition according to claim 13, wherein the monoaldehyde is trans-2-hexenal or 2-octenal.

15. The bonding composition according to claim 13, wherein the monoaldehyde is isobutyraldehyde, 2-methylbutyraldehyde, cinnamaldehyde, methylcinnamaldehyde and positional isomers, 7-hydroxy-3,7-dimethyl-octanal, or 2-methoxycinnamaldehyde.

16. The bonding composition according to claim 13, wherein the monoaldehyde is a cyclic monoaldehyde selected from the group consisting of cyclohexanal, benzaldehyde, 2-chlorobenzaldéhyde, 4-chlorobenzaldéhyde, 3-chlorobenzaldehyde, 2,4-dichlorobenzaldéhyde, 2,6-dichlorobenzaldéhyde, 3-bromobenzaldéhyde, 2-méthylbenzaldéhyde, 4-méthylbenzaldehyde, 4-éthylbenzaldéhyde, 2,5-di-tertbutyl-benzaldéhyde, 4-isopropylbenzaldéhyde, 2-methoxybenzaldéhyde, 4-methoxybenzaldéhyde, 2,5-diméthoxybenzaldéhyde, 3,4-diméthoxybenzaldéhyde, 4-ethoxybenzaldéhyde, 4-benzyloxybenzaldéhyde, 2-hydroxybenzaldéhyde, 3-hydroxybenzaldéhyde, 4-hydroxybenzaldéhyde, 2-hydroxy-3-methoxybenzaldéhyde, or 3,5-dimethoxy-4-hydroxybenzaldéhyde, ethylvanilline, 3-hydroxy-4-methoxybenzaldéhyde, 4-Hydroxy-3-methoxybenzaldéhyde, 2-pyridinecarboxaldehyde, 3-pyridinecarboxaldehyde, 4-pyridinecarboxaldehyde, and 3-methyl-2-thiophene carboxaldehyde.

17. The bonding composition according to claim 13, wherein the dialdehyde is glutaraldehyde, bromomalonaldehyde, terephthalaldehyde, o-Phthalaldehyde, m-Phthalaldéhyde, 4-(4-formylphenoxy) benzaldehyde, or 4-(2-formylphenoxy) benzaldehyde.

18. The bonding composition according to claim 1, wherein the hardener/lignosulphonate salt mass ratio is between approximately 0.1 and approximately 3, and the mass ratio of [hardener+lignosulfonate salt]/latex is between approximately 0.05 and approximately 0.6.

19. The bonding composition according to claim 1, wherein the bonding composition consists essentially of said resin and of said elastomer latex.

20. A bonding composition for textiles, comprising a resin consisting essentially of a product of a reaction between a salt of lignosulfonate and an aldehyde hardener thereof, and an elastomer latex, the aldehyde having at least 2 carbon atoms, wherein the bonding composition does not include resorcinol and the aldehyde is trans-2-hexenal or 2-octenal.

* * * * *